United States Patent
Kim et al.

(10) Patent No.: US 9,191,941 B2
(45) Date of Patent: Nov. 17, 2015

(54) METHOD AND APPARATUS FOR MANAGING RESOURCE

(71) Applicant: Electronics and Telecommunications Research Institute, Daejeon (KR)

(72) Inventors: Sung Kyung Kim, Daejeon (KR); Sung Cheol Chang, Daejeon (KR); Chul Sik Yoon, Daejeon (KR); Mi Young Yun, Daejeon (KR); Won-Ik Kim, Daejeon (KR); Hyun Lee, Daejeon (KR); Seokki Kim, Gyeonggi-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 177 days.

(21) Appl. No.: 13/937,768

(22) Filed: Jul. 9, 2013

(65) Prior Publication Data
US 2014/0016580 A1    Jan. 16, 2014

(30) Foreign Application Priority Data

Jul. 10, 2012 (KR) .................. 10-2012-0075230
Jul. 9, 2013 (KR) .................. 10-2013-0080596

(51) Int. Cl.
| | |
|---|---|
| *H04W 4/00* | (2009.01) |
| *H04W 72/04* | (2009.01) |
| *H04L 1/00* | (2006.01) |

(52) U.S. Cl.
CPC .............. *H04W 72/042* (2013.01); *H04L 1/00* (2013.01); *H04W 72/0446* (2013.01)

(58) Field of Classification Search
CPC ... H04W 72/00; H04W 72/04; H04W 72/042; H04W 72/0446; H04W 72/12; H04L 1/0006
See application file for complete search history.

(56) References Cited

U.S. PATENT DOCUMENTS

| | | | |
|---|---|---|---|
| 2011/0075597 A1* | 3/2011 | Arora ............................. | 370/310 |
| 2011/0305158 A1* | 12/2011 | Kim et al. ..................... | 370/252 |
| 2012/0281652 A1* | 11/2012 | Kim et al. ..................... | 370/329 |

FOREIGN PATENT DOCUMENTS

| | | |
|---|---|---|
| KR | 10-2008-0049958 A | 6/2008 |
| KR | 10-2011-0063276 A | 6/2011 |

* cited by examiner

*Primary Examiner* — Anh Ngoc Nguyen
(74) *Attorney, Agent, or Firm* — Rabin & Berdo, P.C.

(57) ABSTRACT

A method of managing a resource is provided by a base station. The base station allocates a resource to a terminal, and generates a downlink control channel including information of the allocated resource and a transmission time of a next downlink control channel. Further, the base station transmits the downlink control channel to the terminal.

16 Claims, 8 Drawing Sheets

METHOD AND APPARATUS FOR MANAGING RESOURCE

CROSS-REFERENCE TO RELATED APPLICATION

This application claims priority to and the benefit of Korean Patent Application Nos. 10-2012-0075230 and 10-2013-0080596 filed in the Korean Intellectual Property Office on Jul. 10, 2012 and Jul. 9, 2013, respectively, the entire contents of which are incorporated herein by reference.

BACKGROUND OF THE INVENTION (a) Field of the Invention

The present invention generally relates to a method and apparatus for managing a resource.

(b) Description of the Related Art

In a wireless communication system, schemes for allocating radio resources between a transmit node and a receive node, for example a base station and a terminal, include a dynamic allocation and a persistent allocation. When a buffer has a packet to be transmitted in the dynamic allocation, the radio resource for transmitting the packet is requested and allocated. In the persistent allocation, a radio resource is periodically and persistently allocated.

The persistent allocation may be applied to a service in which service traffics have periodical characteristic, for example a voice service. Because a fixed radio resource is periodically allocated and used in the persistent allocation, the base station does not need to transmit allocation information every allocation. Therefore, a radio resource for broadcasting the allocation information can be saved. Further, because a terminal which is the receive node knows a periodic reception time, a power can be saved at times besides the reception time. The dynamic allocation has no limitation for an allocation time, and determines allocation order and allocation amount according to a scheduling algorithm used by a scheduler to provide dynamically the radio resource. Accordingly, the dynamic allocation can maximize resource utilization.

In the persistent allocation, holes of the radio resource may be generated by allocation and deallocation of the periodic fixed resource, and the resource utilization may be decreased by increase of the size of allocated resource. That is, the persistent allocation cannot dynamically fragment and transmit a packet according to the size of resource. However, when traffics have the periodic characteristic and require the relatively big size of allocated radio resource like a multicast-based push-to-talk (PTT) service or a group communication, the persistent allocation deteriorates the system capacity. In addition, the dynamic allocation cannot be appropriate for a power saving of the terminal.

SUMMARY OF THE INVENTION

An aspect of the present invention provides a resource management method and apparatus for supporting a power saving mode of a terminal and efficiently using a radio resource.

According to another aspect of the present invention, a method of managing a resource is provided by a base station. The method includes allocating a resource to a terminal, generating a downlink control channel including information of the allocated resource and a transmission time of a next downlink control channel, and transmitting the downlink control channel to the terminal.

The transmission time of the next downlink control channel may include a next allocation frame interval indicating a frame in which the next downlink control channel is transmitted and a next allocation subframe index indicating a subframe in which the next downlink control channel is transmitted within the frame.

The next allocation frame interval may have a value indicating a frame interval between a frame in which the downlink control channel is transmitted and the frame in which the next downlink control channel is transmitted.

When the next allocation frame interval has "0", the next allocation subframe index may be a subframe index within the frame in which the downlink control channel.

When the next allocation frame interval has a first predetermined value and the next allocation subframe index has a second predetermined value, the transmission time of the next downlink control channel may be not defined.

The downlink control channel may further include a resource allocation flag indicating that the downlink control channel allocates a data burst.

The terminal may belong to a multicast group including a plurality of terminals. In this case, the method may further include masking a cyclic redundancy check (CRC) of the downlink control channel with a CRC mask including an identifier of the multicast group, and attaching the masked CRC to the downlink control channel.

According to yet another aspect of the present invention, a method of managing a resource is provided by a terminal. The method includes receiving from a base station a downlink control channel including information of an allocated resource and a transmission time of a next downlink control channel, identifying the allocated resource based on the downlink control channel, and identifying the transmission time of the next downlink control channel based on the downlink control channel.

The transmission time of the next downlink control channel may include a next allocation frame interval indicating a frame in which the next downlink control channel is transmitted and a next allocation subframe index indicating a subframe in which the next downlink control channel is transmitted within the frame.

The next allocation frame interval may have a value indicating a frame interval between a frame in which the downlink control channel is transmitted and the frame in which the next downlink control channel is transmitted.

When the next allocation frame interval has "0", the next allocation subframe index may be a subframe index within the frame in which the downlink control channel.

When the next allocation frame interval has a first predetermined value and the next allocation subframe index has a second predetermined value, the transmission time of the next downlink control channel may be not defined.

The downlink control channel may further include a resource allocation flag indicating that the downlink control channel allocates a data burst.

The terminal may belong to a multicast group including a plurality of terminals. In this case, the downlink control channel may include a CRC masked with a CRC mask including an identifier of the multicast group.

According to still another aspect of the present invention, an apparatus for managing a resource is provided. The apparatus includes a resource manager configured to allocate a resource to a terminal and to generate a downlink control channel including information of the allocated resource and a transmission time of a next downlink control channel, and a transmitter configured to transmit the downlink control channel to the terminal.

The transmission time of the next downlink control channel may include a next allocation frame interval indicating a frame in which the next downlink control channel is transmitted and a next allocation subframe index indicating a subframe in which the next downlink control channel is transmitted within the frame.

The next allocation frame interval may have a value indicating a frame interval between a frame in which the downlink control channel is transmitted and the frame in which the next downlink control channel is transmitted.

According to further aspect of the present invention, an apparatus for managing a resource is provided. The apparatus includes a receiver configured to receive from a base station a downlink control channel including information of an allocated resource and a transmission time of a next downlink control channel, and a controller configured to identify the allocated resource and the transmission time of the next downlink control channel based on the downlink control channel.

The transmission time of the next downlink control channel may include a next allocation frame interval indicating a frame in which the next downlink control channel is transmitted and a next allocation subframe index indicating a subframe in which the next downlink control channel is transmitted within the frame.

The next allocation frame interval may have a value indicating a frame interval between a frame in which the downlink control channel is transmitted and the frame in which the next downlink control channel is transmitted.

DETAILED DESCRIPTION OF THE EMBODIMENTS

Figure 1:
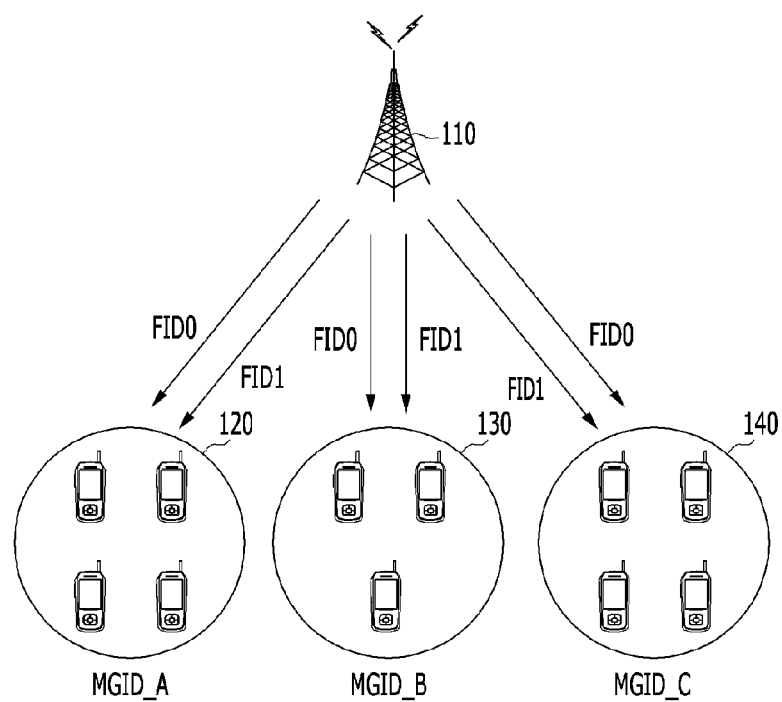
FIG. 1 shows a multicast communication system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "terminal" may designate a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), and so on, or may include all or some functions thereof.

Further, the term "base station" (BS) may designate an advanced base station (ABS), a high reliability base station (HR-BS), a node B, an evolved node B (eNodeB), an access point (AP), a radio access station (RAS), a base transceiver station (BTS), an MMR (mobile multihop relay)-BS, a relay station (RS) performing base station function, a relay node (RN) performing base station function, an advanced relay station (ARS) performing base station function, a high reliability relay station (HR-RS) performing the base station function, a small cell BS (femto BS, home node B (HNB), pico BS, metro BS, micro BS, and so on), and so on, or may include all or some functions thereof.

FIG. 1 shows a multicast communication system according to an embodiment of the present invention.

Referring to FIG. 1, a base station 110 uses a multicast group identifier (ID) allocated to a multicast group 120, to provide the multicast group 120 including a plurality of terminals with a multicast communication. The multicast group ID is uniquely allocated within the base station 110 and has a finite size. The multicast group ID is used as an ID for notifying the multicast group of the allocated resource. Other multicast groups 120, 130, and 140 have different multicast group ID MGID A, MGID B, and MGID C.

The base station 110 uses a flow identifier (FID) for identifying a connection besides the multicast group ID. The base station 110 allocates the FID in each multicast group ID, thereby uniquely identifying the connection, i.e., a service flow within the multicast group. Since the FID is an ID for identifying a signal or traffic connection within the multicast group, a particular connection of the multicast group can be identified a combination of the multicast group ID and FID in the base station 110. That is, the base station 110 uses the multicast group ID and the FID to provide the multicast group 120 with a multicast service. The same FID (FID0 or FID) may be used in the other multicast groups 120, 130, and 140.

Figure 2:
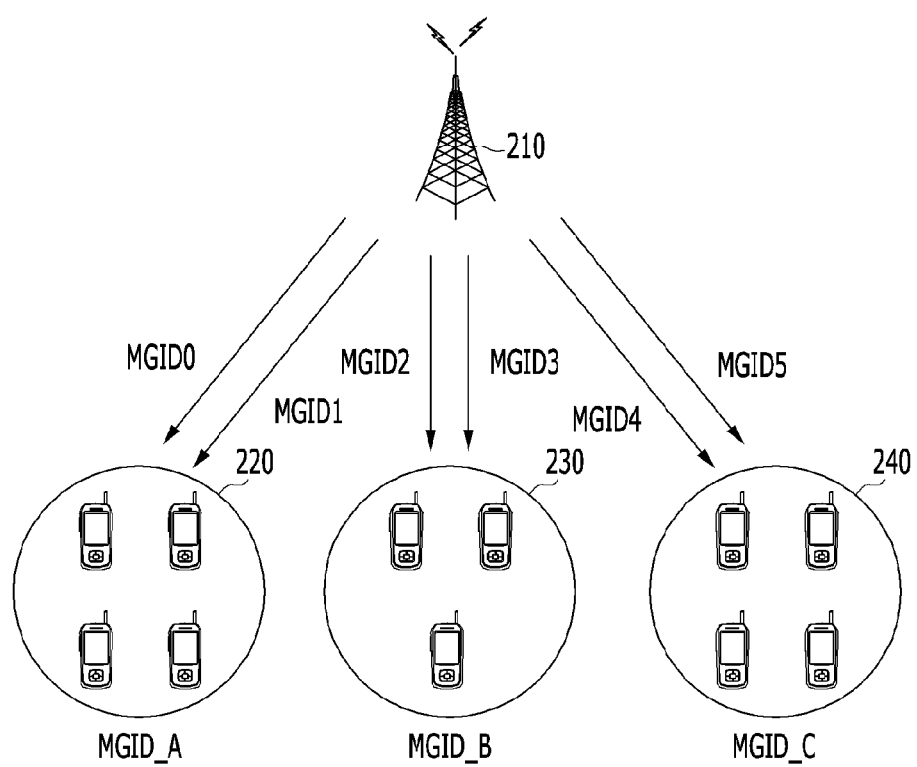
FIG. 2 shows a multicast communication system another embodiment of the present invention.

FIG. 2 shows a multicast communication system another embodiment of the present invention.

Referring to FIG. 2, a base station 210 uses a multicast group ID to provide a multicast group 220 including a plurality of terminals with the multicast service. The multicast group ID is uniquely allocated for identifying a connection, i.e., a service flow of the multicast group, and has a finite size. This multicast group ID may have a greater size than the multicast group ID described in FIG. 1, in order to identify the service flow as well as the multicast group. For example, the multicast group ID of FIG. 1 may have 12 bits, and the multicast group ID of FIG. 2 may have 16 bits.

Different multicast group IDs (MGID0, MGID1, MGID2, MGID3, MGID4, and MGID5) are used in different multicast groups 220, 230, and 240. A multicast resource allocated to the multicast service can be notified to the multicast group through the multicast group ID.

Figure 3:
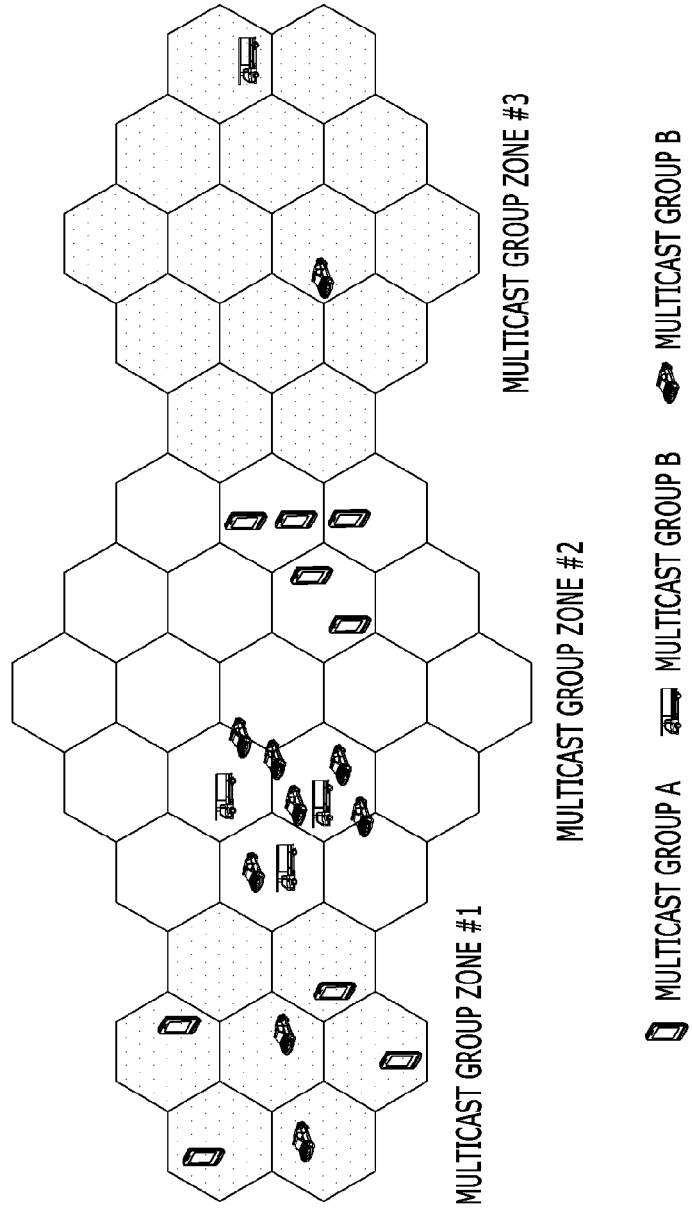
FIG. 3 shows a multicast communication system according to yet another embodiment of the present invention.

FIG. 3 shows a multicast communication system according to yet another embodiment of the present invention.

Referring to FIG. 3, a multicast group zone is defined as a base station set including at least one base station in a group communication system according to an embodiment of the present invention. A unique multicast group zone ID is allocated to the multicast group zone. A multicast group ID having a unique value is allocated to a multicast group within the multicast group zone, and a multicast service can be identified using an FID within the multicast group. That is, the multicast service that is provided within the multicast group zone can be identified using the multicast group ID and FID. Alternatively, a multicast group ID having a unique value is allocated to a multicast group within the multicast group zone, and a multicast service that is provided within the multicast group zone can be identified using the multicast group ID.

In the multicast group zone, a set of base stations uses the same multicast group ID and FID or the same multicast group ID for transmitting data of a certain service flow. Accordingly, if a terminal has already registered with a base station for a multicast service, the terminal can be seamlessly receive the multicast service without reregistering with other base station even if the terminal moves to the other base station within the same multicast group zone. If the terminal moves from a base station to another base station, those base stations provide the same multicast service but belong to different multicast group zone, the terminal can seamlessly receive the multicast service by updating a parameter associated with the multicast service.

If only one base station belongs to a multicast group zone, the single base station uses a multicast group ID for providing a multicast service, independently from other base stations.

Figure 4:
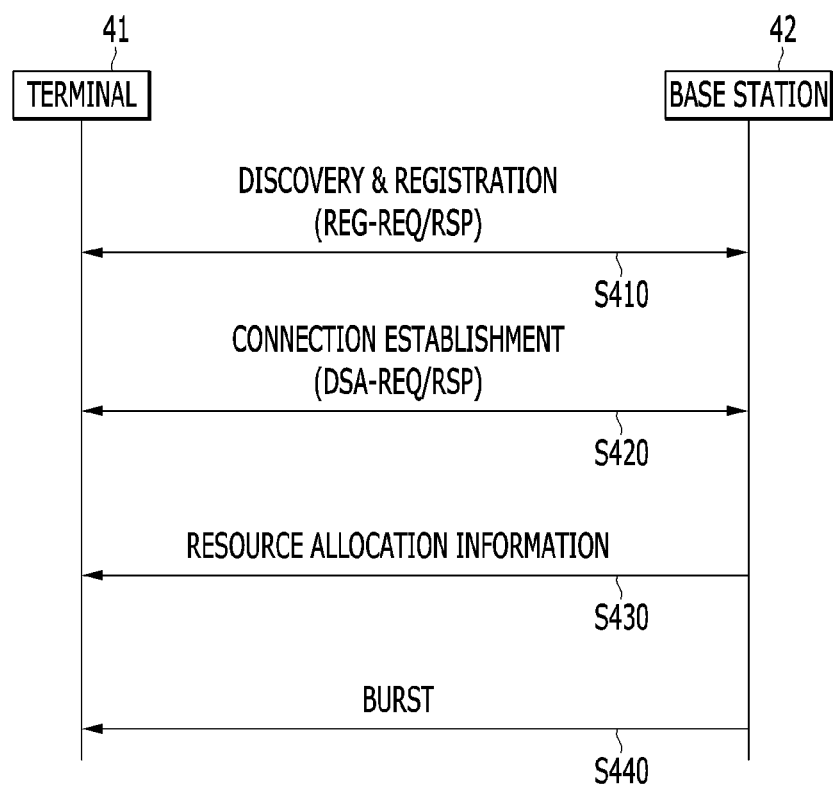
FIG. 4 shows a multicast connection establishment method according to an embodiment of the present invention.

FIG. 4 shows a multicast connection establishment method according to an embodiment of the present invention.

Referring to FIG. 4, a terminal 41 transmits a registration request (REG-REQ) message and a base station 42 transmits a registration response (REG-RSP) message to the terminal 41 in response to the REG-REQ message (S410). To discover a multicast service, the terminal 41 informs the base station 42 of support of multicast transmission by the REG-REQ message and the base station 42 registers the terminal 41 by the REG-RSP message.

When the terminal 41 registers to receive the multicast service, either the terminal 41 or the base station 42 initiates a dynamic service addition (DSA) procedure for a multicast connection service (S420). The one node of the terminal 41 and the base station 42 transmits a DSA-REQ message to the other node and receives a DSA-RSP message from the other node such that the multicast connection is established.

The DSA-REQ and DSA-RSP messages include a multicast parameter associated with the multicast service. The multicast parameter includes a multicast group ID of a multicast group to which a service flow is added. The multicast parameter may further include a FID associated with the multicast group ID.

Further, when a multicast group zone is supported, the multicast parameter may further include a multicast group zone ID where the service flow is valid. The terminal 41 can add the service flow for starting a multicast service by the multicast parameter. Alternatively, the base station may periodically broadcast a multicast group zone ID through a broadcast message. If the multicast group zones are not locally overlapped with each other and are identified from each other (that is, a base station belongs to only one multicast group zone or the multicast group zone is not defined), the multicast parameter of the DSA-REQ or DSA-RSP message may not include multicast group zone ID.

The terminal 41 and the base station 42 may not exchange a multicast service capability in the REQ-REQ/RSP exchange procedure (S410) but exchange the multicast service capability in the DSA-REQ/RSP exchange procedure (S420).

As such, after establishing the service flow, the terminal 41 receives a downlink control channel including multicast resource allocation information from the base station 42 (S430), and receives a multicast data burst from the base station 42 through the allocated resource (S440).

When a change of the service flow is required in the multicast service, the terminal 41 and the base station 42 may perform a dynamic service change (DSC) procedure. That is, any one node of the terminal 41 and the base station 42 transmits a DSC-REQ message, and the other node responds as a DSC-RSP message. In this case, the DSC-REQ message and the DSC-RSP message include a multicast parameter. The multicast parameter may include a current multicast group ID and a new multicast group ID, or current multicast group ID and FID and new multicast group ID and FID. The multicast parameter may further include a new multicast group zone ID.

When the multicast service is terminated, the terminal 41 and the base station 42 may perform a dynamic service delete (DSD) procedure to delete the service flow. In this case, the multicast service of the multicast group may be terminated using the multicast group ID in the DSD procedure. The base station may terminate the multicast service using the multicast group zone ID in the DSD procedure. Any one node of the terminal 41 and the base station 42 transmits a DSD-REQ message, and the other node responds as a DSD-RSP message.

As described above, according to an embodiment of the present invention, a terminal and a base station can identify a supported multicast service through an exchange of a multicast service capability, and add, change or delete a service flow for the multicast service through a DSx (DSA, DSC, or DSD) procedure.

Figure 5:
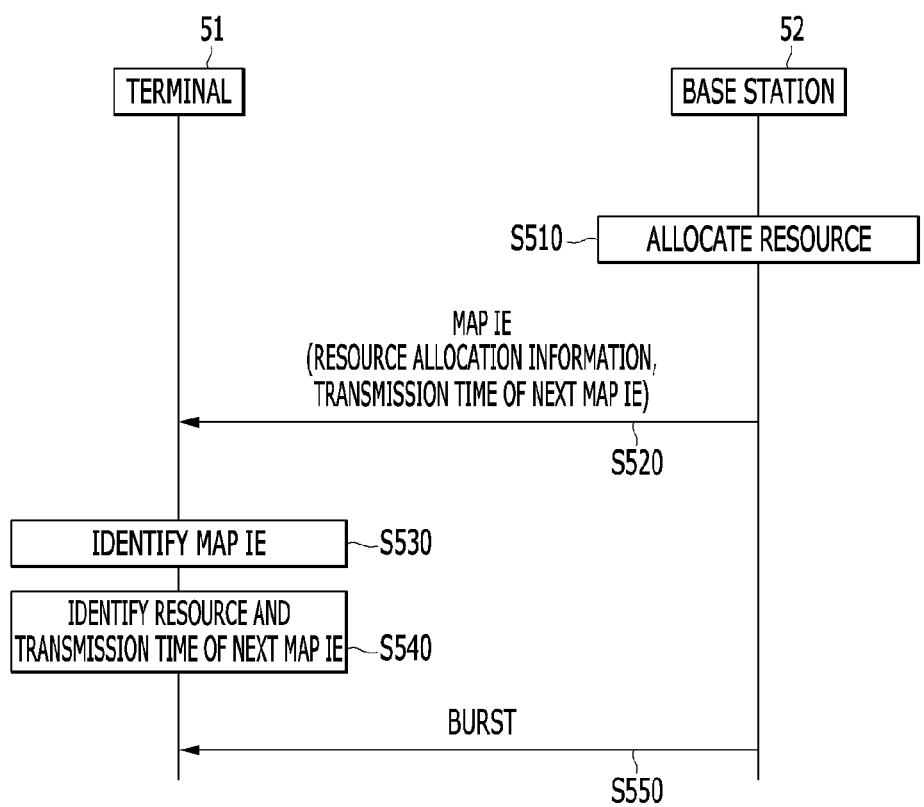
FIG. 5 is a flowchart of a resource management method according to an embodiment of the present invention.

FIG. 5 is a flowchart of a resource management method according to an embodiment of the present invention.

Referring to FIG. 5, a base station 52 allocates a resource to a terminal 51 (S510), and transmits a downlink control channel including resource allocation information to the terminal 51 (S520). The downlink control channel may be a MAP information element (IE). For the resource allocation, a new MAP IE may be defined. For example, the new MAP IE may be an HR-Multicast DL MAP IE (high reliability multicast downlink MAP IE) or an HR Multicast DL Assignment A-MAP IE that is a new type of A-MAP (advance MAP). When the terminal 51 belongs to a multicast group, the base station 52 may allocate the same multicast resource to a plurality of terminals belonging to the multicast group.

The base station 52 notifies a transmission time of a next downlink control channel as well as the resource allocation information when transmitting the downlink control channel. The base station 52 may notify a frame in which the next downlink control channel is transmitted and a subframe in which the next downlink control channel is transmitted within said frame, in order to notify the transmission time of the next downlink control channel. In this case, the downlink control channel may include a next allocation frame interval and a next allocation subframe index as in Table 1.

TABLE 1

| Information | Description |
| --- | --- |
| Next Allocation Frame Interval | Next transmission allocation interval of a downlink control channel |
| Next Allocation Subframe Index | Subframe index in a next allocation frame |
| Resource Allocation Flag | Indicates whether a current downlink control channel allocates a data burst or not |

The next allocation frame interval indicates a frame in which the next downlink control channel is transmitted, and may have a value representing a frame interval between the current frame and the frame in which the next downlink control channel is transmitted. For example, the next allocation frame interval may have 3 bits, and "0b000", "0b001", "0b010", "0b011", "0b100", and "0b101" may indicate the current frame, 1 frame, 2 frames, 3 frames, 4 frames, and 8 frames, respectively. The next allocation subframe index indicates a subframe in which the next downlink control channel is transmitted within the frame indicated by the next allocation frame interval. For example, the next allocation subframe index may have 3 bits, and its value may correspond to a subframe index.

Then next allocation frame interval may be used in a power saving mode operation of the terminal. That is, because the terminal knows the transmission time of the next downlink control channel, it can receive the next downlink control channel in the power saving mode if necessary When traffics periodically occur like a voice service, the next allocation frame interval may be determined according to a cycle in which the traffics periodically occur. Further, an allocation cycle may be variably set for an efficient operation of radio resources.

When the next allocation frame interval has "0b000", that is, the next downlink control channel is transmitted in a current frame, the next allocation subframe index indicates a subframe index within the current frame.

When both of the next allocation frame interval and the next allocation subframe index have "0b000", it indicates that the downlink control channel does not include information on a transmission time of the next downlink control channel. In other words, the downlink control channel does not indicate a next allocation time of resource. This may mean a transmission of the connection is stopped for a certain time. In this case, the base station may transmit the downlink control channel to restart the transmission. When a certain terminal operates in a power saving mode such a sleep mode or an idle mode, the downlink control channel may be transmitted in a listening interval of the power saving mode.

As shown in Table 1, the downlink control channel may further include a resource allocation flag. The resource allocation flag indicates whether the downlink control channel includes information of burst allocation or not. For example, the resource allocation flag may have 1 bit, "0b0" may indicate no allocation of data burst, and "0b1" may indicate the allocation of data burst.

The terminal 51 identifies whether the received MAP IE corresponds to a multicast group to which the terminal 51 belongs, based on the received MAP IE (S530). The terminal 51 identifies the allocated resource and a transmission time of the next resource allocation information, based on the identified MAP IE (S540)

Next, the terminal 51 receives a data burst through the allocated resource (S550).

Figure 6:
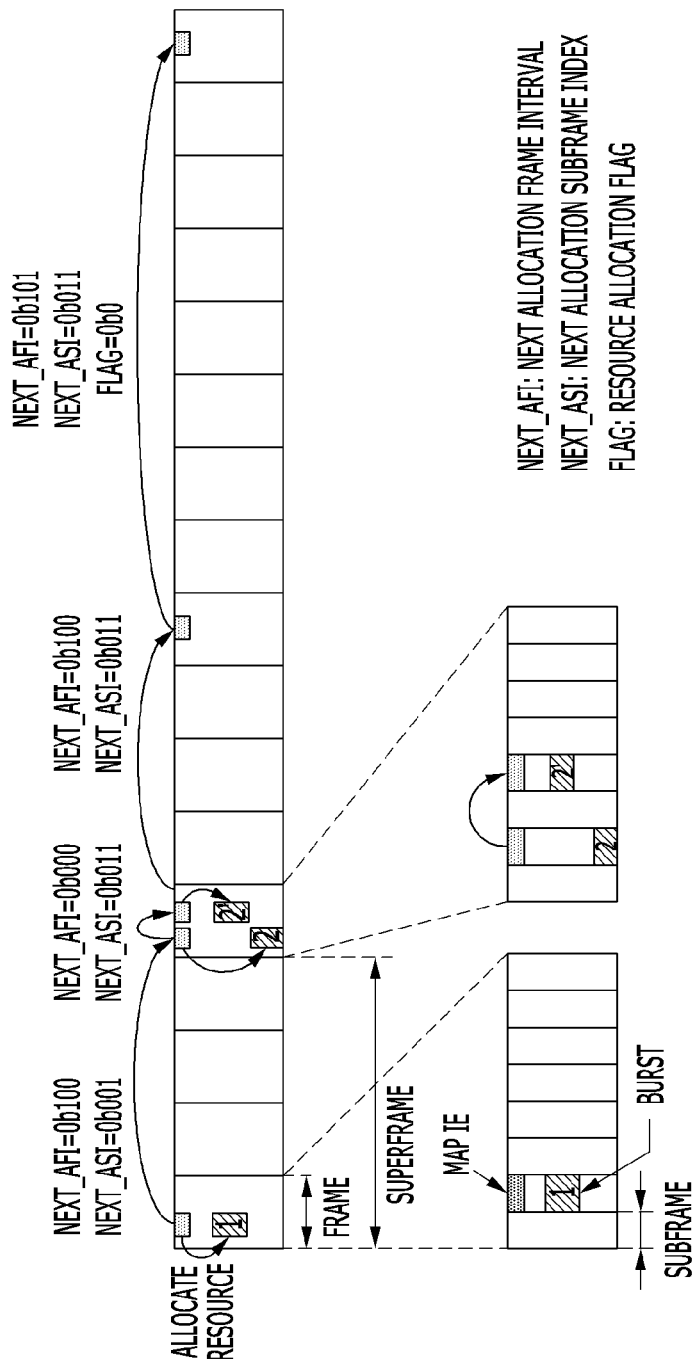
FIG. 6 shows an example of a resource management method according to an embodiment of the present invention.

FIG. 6 shows an example of a resource management method according to an embodiment of the present invention.

As shown in FIG. 6, a base station allocates a resource to a multicast group, transmits a downlink control channel, i.e., MAP IE, including resource allocation information. The base station transmits a multicast burst on the allocated resource. The MAP IE includes a next allocation frame interval and a next allocation subframe index.

In an example shown in FIG. 6, the first MAP IE has "0b100" as a next allocation frame interval, "0b001" as a next allocation subframe index, and "0b1" as a resource allocation flag. Accordingly, the multicast burst is transmitted on a position corresponding to the resource allocation information of the first MAP IE, and the second MAP IE is transmitted at a subframe whose index is 1 in a frame after four frames from the first frame. The second MAP IE has "0b000" as the next allocation frame interval, "0b011" as the next allocation subframe index, and "0b1" as the resource allocation flag. The multicast burst is transmitted on a position corresponding to the resource allocation information of the second MAP IE, and third MAP IE is transmitted at a subframe whose index is 3 in a frame in which the second MAP IE is included. The third MAP IE has "0b101" as the next allocation frame interval, has "0b011" as the next allocation subframe index, and "0b0" as the resource allocation flag. The fourth MAP IE is transmitted at a subframe whose index is 3 in a frame after eight frames from the frame in which the third MAP IE is transmitted. Since the resource allocation flag of the third MAP IE has "0b0", no multicast burst is transmitted.

As described above, according to an embodiment of the present invention, the base station can freely set an allocation resource for a burst transmission with a variable position and a variable transmission level, every allocation. The transmission level may be a modulation and coding scheme (MCS) level. Further, as shown in FIG. 6, when a resource within one subframe has a size that cannot one voice packet, the base station may fragment the voice packet into a plurality of packets 2 and 2' and transmit the fragmented packets. The other fragmented packet 2' can be transmitted in a next effective subframe, and a resource allocation cycle may be set to be the same as a voice cycle. Accordingly, the resource can be efficiently managed.

Next, an example of a downlink control channel according to an embodiment of the present invention is described with reference to Table 2.

A base station may define a multicast allocation A-MAP IE to allocate a multicast resource using an A-MAP. The multicast allocation A-MAP IE may be for example an HR-Multicast DL Assignment A-MAP IE.

The multicast allocation A-MAP IE includes a next allocation frame interval, a next allocation subframe index, a resource allocation flag, and multicast allocation information, as described above. The multicast allocation information may include a resource index indicating a location and a size of the multicast resource. The multicast allocation information may further include information (Isizeoffset) used to compute a burst size index and an indicator (long TTI indicator) indicating the number of subframes spanned by the allocated resource.

The base station may generate 16-bit cyclic redundancy check (CRC) based on the randomized sequence of information bits of the multicast allocation A-MAP IE. Further, the base station may mask the 16-bit CRC by a CRC mask including a multicast group ID, and attach the masked CRC to the multicast allocation A-MAP IE. The terminal can identify the multicast allocation A-MAP IE using the CRC mask including the multicast group ID to which it belongs. That is, the terminal can identify the multicast allocation A-MAP IE corresponding to the multicast group to which it belongs using the CRC mask.

TABLE 2

| Field | Size (bits) | Value/Description |
|---|---|---|
| HR-Multicast_DL_Assignment_A-MAP_IE( ) { | | |

TABLE 2-continued

| Field | Size (bits) | Value/Description |
|---|---|---|
| A-MAP IE Type | 4 | HR-Multicast DL Assignment A-MAP IE |
| Next Allocation Frame Interval | 3 | Next transmission allocation interval of multicast DL assignment A-MAP IE. If (Next Allocation Frame Interval == 0b000) and (Next Allocation subframe Index == 0b000), it indicates that the Multicast DL assignment A-MAP IE dose not express the transmission time of next Multicast DL assignment A-MAP IE. 0b000: current frame 0b001: 1 frame 0b010: 2 frames 0b011: 3 frames 0b100: 4 frames 0b101: 8 frames 0b110-0b111: reserved |
| Next Allocation Subframe Index | 3 | Subframe index in the next allocation frame. When the Next Allocation Frame Interval == 0b000 and Resource allocation flag == 0b 1(the current frame is allocated), the Next Allocation Subframe Index shall be one of the subsequent subframes in this frame. |
| Resource allocation flag | 1 | It indicates whether the current Multicast DL Assignment A-MAP IE allocates a Multicast Data Burst or not. 0b0: not included 0b1: included |
| If (Resource allocation flag == 0b1){ | | |
|   Isizeoffset | 5 | Offset used to compute burst size index |
|   MEF | 2 | MIMO encoder format 0b00: SFBC 0b01: Vertical encoding 0b10: Multi-layer encoding 0b11: CDR |
|   If (MEF == 0b01) { | | Parameter for vertical encoding |
|     $M_t$ | 3 | Number of streams in transmission $M_t <= N_t$ $N_t$: Number of transmit antennas at the HR-BS 0b000: 1 stream 0b001: 2streams 0b010: 3streams 0b011: 4streams 0b100: 5streams 0b101: 6streams 0b110: 7streams 0b111: 8streams |
|     Reserved | 1 | |
|   } else if (MEF == 0b10) { | | Parameters for multi-layer encoding |
|     Si | 4 | Index to identify the combination of the number of streams and the allocated pilot stream index in a transmission with MU-MIMO and the modulation constellation of paired user in the case of 2 stream transmission 0b0000: 2 streams with PSI = stream1 and other modulation = QPSK 0b0001: 2 streams with PSI = stream1 and other modulation = 16QAM 0b0010: 2 streams with PSI = stream1 and other modulation = 64QAM 0b0011: 2 streams with PSI = stream1 and other modulation information not available 0b0100: 2 streams with PSI = stream2 and other modulation = QPSK 0b0101: 2 streams with PSI = stream2 and other modulation = 16QAM 0b0110: 2 streams with PSI = stream2 and other modulation = 64QAM |

TABLE 2-continued

| Field | Size (bits) | Value/Description |
|---|---|---|
| | | 0b0111: 2 streams with PSI = stream2 and other modulation information not available |
| | | 0b1000: 3 streams with PSI = stream1 |
| | | 0b1001: 3 streams with PSI = stream2 |
| | | 0b1010: 3 streams with PSI = stream3 |
| | | 0b1011: 4 streams with PSI = stream1 |
| | | 0b1100: 4 streams with PSI = stream2 |
| | | 0b1101: 4 streams with PSI = stream3 |
| | | 0b1110: 4 streams with PSI = stream4 |
| | | 0b1111: n/a |
| } | | |
| Resource Index | 11 | 5 MHz: 0 in first 2 MSB bits + 9 bits for resource index |
| | | 10 MHz: 11 bits for resource index |
| | | 20 MHz: 11 bits for resource index |
| | | Resource index includes location and allocation size. |
| Long TTI Indicator | 1 | Indicates number for AAI subframes spanned by the allocated resource. |
| | | 0b0: 1 AAI subframe (default TTI) |
| | | 0b1: 4 DL AAI subframe for FDD or all DL AAI subframes for TDD (long TTI) |
| Reserved | 6 | |
| } | | |
| } | | |

Since fields that are not explained in Table 2 are defined in for example IEEE Std 802.16.1-2012, descriptions for the fields are omitted.

Next, a resource management apparatus for performing a resource management method according to an embodiment of the present invention is described with reference to FIG. 7 and FIG. 8.

Figure 7:
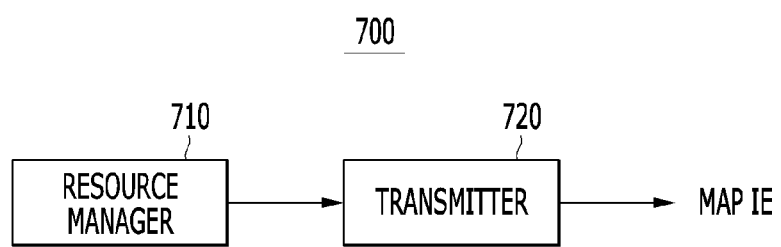
FIG. 7 and FIG. 8 are block diagrams of a resource management apparatus according to an embodiment of the present invention.
Figure 8:
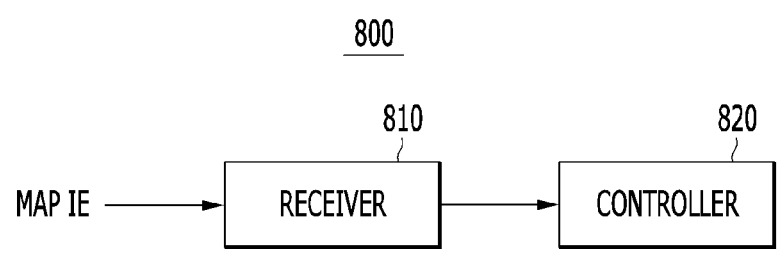

FIG. 7 and FIG. 8 are block diagrams of a resource management apparatus according to an embodiment of the present invention.

Referring to FIG. 7, a resource management apparatus 700 includes a resource manager 710 and a transmitter 720.

The resource manager 710 allocates a resource to a terminal, and generates a MAP IE including allocation information of the resource, a next allocation frame interval, a next allocation subframe index, and a resource allocation flag. The transmitter 720 transmits the MAP IE to the terminal.

The resource management apparatus 700 may be included in a base station, or may be the base station itself.

Referring to FIG. 8, a resource management apparatus 800 includes a receiver 810 and a controller 820.

The receiver 810 receives a MAP IE transmitted by a base station. The MAP IE includes a next allocation frame interval, a next allocation subframe index, a resource allocation flag, and allocation information of a resource allocated to the terminal. When the MAP IE corresponds to a multicast group to which a terminal belongs, the controller 820 identifies the MAP IE based on a multicast group ID or CRC mask, and identifies the allocated resource and a transmission time of a next MAP IE based on the identified MAP IE.

The resource management apparatus 800 may be included in the terminal, or may be the terminal itself.

At least part function of a resource management method or apparatus according to an embodiment of the present invention may be implemented a hardware or a software combined with the hardware. For example, a processor such as a central processing unit (CPU), other chipset, or a microprocessor may perform a function of a resource manager 710 or a controller 820, and a transceiver may perform a function of a transmitter 720 or a receiver 810.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of managing a resource by a base station, the method comprising:
    allocating the resource to a terminal;
    generating a downlink control channel including
        information of the allocated resource, and
        a transmission time of a next downlink control channel, including
            a next allocation frame interval indicating a frame in which the next downlink control channel is transmitted, the frame including a plurality of subframes, and
            a next allocation subframe index indicating one of the plurality of subframes in which the next downlink control channel is transmitted; and
    transmitting the downlink control channel to the terminal.

2. The method of claim 1, wherein the next allocation frame interval has a value indicating a frame interval between a frame in which the downlink control channel is transmitted and the frame in which the next downlink control channel is transmitted.

3. The method of claim 2, wherein, when the value of the next allocation frame interval is "0", the next allocation subframe index is a subframe index within the frame in which the downlink control channel is transmitted.

4. The method of claim 1, wherein, when the next allocation frame interval has a first predetermined value and the next allocation subframe index has a second predetermined value, the transmission time of the next downlink control channel is not defined.

5. The method of claim 1, wherein the downlink control channel further includes a resource allocation flag indicating that the downlink control channel allocates a data burst.

6. The method of claim 1, wherein
the terminal belongs to a multicast group including a plurality of terminals, and
the method further comprises
masking a cyclic redundancy check (CRC) of the downlink control channel with a CRC mask including an identifier of the multicast group, and
attaching the masked CRC to the downlink control channel.

7. A method of managing a resource by a terminal, the method comprising:
receiving, from a base station, a downlink control channel including
information of an allocated resource, and
a transmission time of a next downlink control channel, including
a next allocation frame interval indicating a frame in which the next downlink control channel is transmitted, the frame including a plurality of subframes, and
a next allocation subframe index indicating one of the plurality of subframes in which the next downlink control channel is transmitted;
identifying the allocated resource based on the downlink control channel; and
identifying the transmission time of the next downlink control channel based on the downlink control channel.

8. The method of claim 7, wherein the next allocation frame interval has a value indicating a frame interval between a frame in which the downlink control channel is transmitted and the frame in which the next downlink control channel is transmitted.

9. The method of claim 8, wherein, when the value of the next allocation frame interval is "0", the next allocation subframe index is a subframe index within the frame in which the downlink control channel is transmitted.

10. The method of claim 7, wherein, when the next allocation frame interval has a first predetermined value and the next allocation subframe index has a second predetermined value, the transmission time of the next downlink control channel is not defined.

11. The method of claim 7, wherein the downlink control channel further includes a resource allocation flag indicating that the downlink control channel allocates a data burst.

12. The method of claim 7, wherein the terminal belongs to a multicast group including a plurality of terminals, and the downlink control channel includes a cyclic redundancy check (CRC) masked with a CRC mask including an identifier of the multicast group.

13. An apparatus for managing a resource, the apparatus comprising:
a resource manager configured
to allocate the resource to a terminal, and
to generate a downlink control channel including
information of the allocated resource, and
a transmission time of a next downlink control channel, including
a next allocation frame interval indicating a frame in which the next downlink control channel is transmitted, the frame including a plurality of subframes, and
a next allocation subframe index indicating one of the plurality of subframes in which the next downlink control channel is transmitted; and
a transmitter configured to transmit the downlink control channel to the terminal.

14. The apparatus of claim 13, wherein the next allocation frame interval has a value indicating a frame interval between a frame in which the downlink control channel is transmitted and the frame in which the next downlink control channel is transmitted.

15. An apparatus for managing a resource, the apparatus comprising:
a receiver configured to receive, from a base station, a downlink control channel including
information of an allocated resource, and
a transmission time of a next downlink control channel, including
a next allocation frame interval indicating a frame in which the next downlink control channel is transmitted, the frame including a plurality of subframes, and
a next allocation subframe index indicating one of the plurality of subframes in which the next downlink control channel is transmitted; and
a controller configured to identify the allocated resource and the transmission time of the next downlink control channel based on the downlink control channel.

16. The apparatus of claim 15, wherein the next allocation frame interval has a value indicating a frame interval between a frame in which the downlink control channel is transmitted and the frame in which the next downlink control channel is transmitted.

* * * * *